Aug. 21, 1962     H. G. NISSER ET AL     3,050,188
FLOTATION MACHINE
Filed March 10, 1960
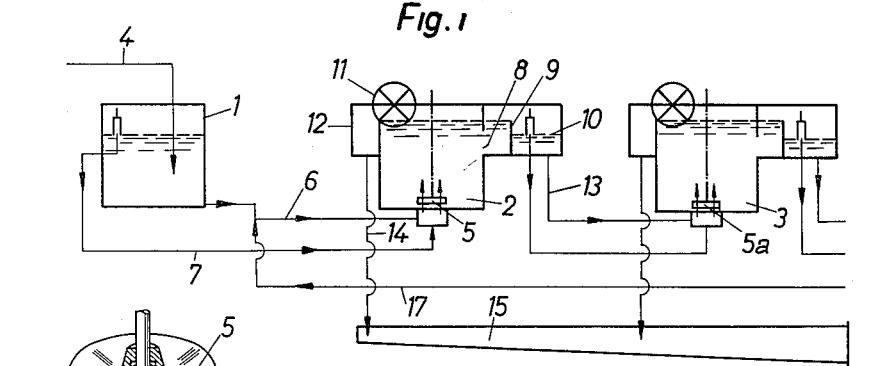
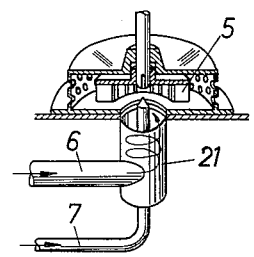
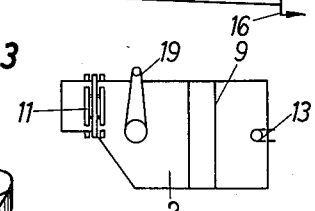
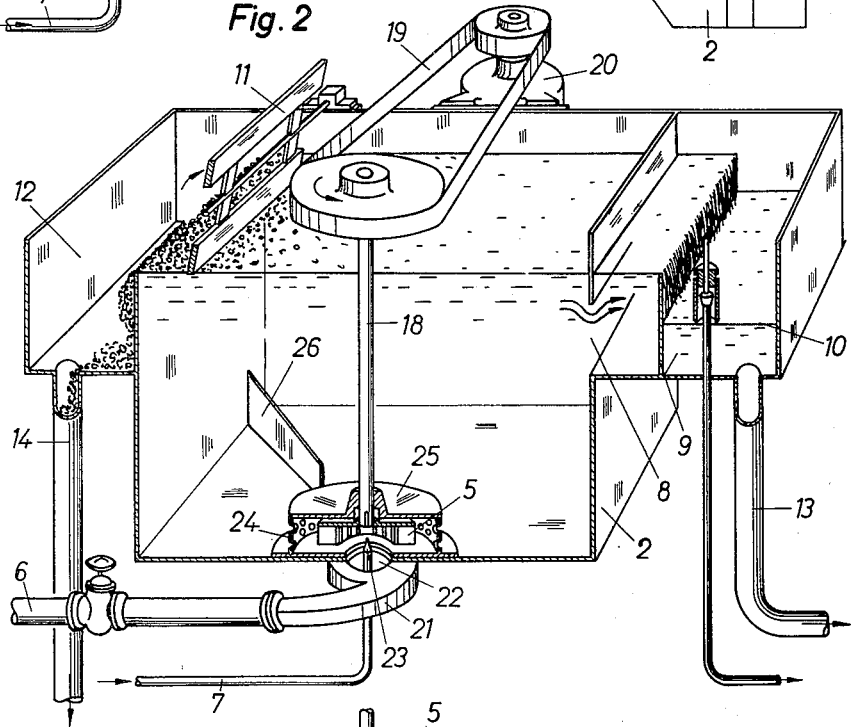
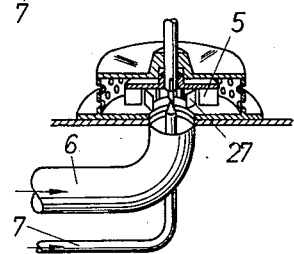
INVENTORS
HENRIK NISSER
BY WOLFGANG BREUNINGER
Toulmin & Toulmin
Attorneys

United States Patent Office 3,050,188
Patented Aug. 21, 1962

3,050,188
FLOTATION MACHINE
Henrik G. Nisser and Wolfgang Breuninger, Heidenheim (Brenz), Germany, assignors to J. M. Voith Gesellschaft mit beschrankter Haftung, Heidenheim (Brenz), Germany
Filed Mar. 10, 1960, Ser. No. 14,050
Claims priority, application Germany Mar. 12, 1959
12 Claims. (Cl. 209—170)

The present invention relates to a flotation machine and more particularly to a flotation machine for removing printer's ink from old waste paper.

It is known in the art to separate substances, which are only slightly or not wettable with water, from substances which are wettable with water, in that the particles of a suspension in a flotation liquid which are unwettable with water adhere to small air bubbles entrained in the liquid. In this manner the particles of the suspension which are not or only slightly wettable are given additional buoyancy, so that these particles rise to the surface of the liquid and can be skimmed off. In the case of the flotation of old waste paper dissolved in water, the paper fibres constitute the wettable substance and the printing ink constitutes the substance which is not wettable with water. The suspension is mixed with air with the result that the undesired particles of ink adhere to the surface of the air bubbles. The air bubbles with the separated particles of ink then rise and can be skimmed off the surface of the liquid. By the addition of chemicals the wettability of a substance can be influenced within wide limits.

The known apparatus for carrying out the flotation process comprises a flotation unit, preferably an agitator unit. The flotation unit is, for example, separated into a stirring compartment and a foam compartment. In the stirring compartment the uncleaned material is set in rotation so vigorously by an impeller, that the air introduced from the suspension surface is finely distributed in the liquid suspension. The uncleaned material thus permeated with air bubbles passes over through a slot into the foam compartment. Here the air bubbles with the impurities adhering to them rise to the surface and can be removed by a skimming device. In another form of construction the stirring and foam compartments are superposed and separated by a tranquilizing screen. In this case the air is introduced under pressure from below near the impeller through a special conduit. In another form of construction only one chamber is used in which the air is fed to the impeller from above through a pipe surrounding the impeller shaft. In this case, the air mixes with the uncleaned material before reaching the impeller. In a further development of the apparatus an annular member encircling the impeller has stationary webs forming a deflecting device intended to produce a fine distribution of air. For properly separating the foam and the cleaned suspension, the stirring compartment has an overflow leading off the foam, composed substantially of the air bubbles and printer's ink, flotation chemicals and water. A second overflow, located at a lower level, leads off the cleaned suspension.

In these well-known arrangements in which the suspension mass flows to the impeller through a chamber or similar means, the impeller blades are necessarily subjected to an unequal admission. As a result, there is unsymmmetrical discharge from the impeller and, consequently, an unequal and non-uniform distribution of the air bubbles in the uncleaned material. Most of the bubbles are relatively large and have only a small specific surface. Moreover, the suspension is intensively permeated with air in some places, whereas it is entirely without air bubbles in others. Another objection to the known machines is that the foam skimmed off still contains a relatively large quantity of fiber material.

It is the object of the present invention to ensure a good and fine distribution of the air bubbles in the suspension because this is of primary importance for the separation of the ink particles from the soaked paper fiber suspension. The finer the bubbles are distributed and split up, the greater will be the quantity of ink separated per unit. Another object of the invention is to obtain the best possible separation of the foam and cleaned suspension without the foam still containing a relatively large quantity of fibers.

In order to attain these objects the invention employs new means for feeding the uncleaned material and air, a new construction of agitator and a novel method for leading off the foam.

An embodiment of the present invention is illustrated by way of example in the accompanying drawings, wherein FIGURE 1 is a diagrammatic view of the flotation machine according to the invention;

FIGURE 2 shows a single flotation unit in perspective view, partly in section, and FIGURE 3 is a top plan view of the flotation unit illustrated in FIGURE 2;

FIGURE 4 shows an alternative arrangement of equipment producing a whirling motion;

FIGURE 5 shows another mode of construction of this equipment with guide vanes.

Referring now to the drawings more in detail and turning to FIGURE 1, there is provided a container 1 and flotation units 2 and 3. The uncleaned material to be treated flows into the container 1 through a conduit 4. The uncleaned material is conveyed out of container 1 through a conduit 6 and, at the same time, air is introduced through a conduit 7. The cleaned suspension passes out of the unit 2 through an aperture 8 arranged on a side wall of the tank near and below the liquid surface and flows through an overflow 9 into a box 10. From there the pre-cleaned suspension is then carried to the impeller of the next following flotation unit 3 through a conduit 13. The foam is conducted by means of a skimming device 11 into a box 12 and flows through a conduit 14 into a collecting tank 15 from which it is conducted through a conduit 16 to a so-called secondary set, not shown in the drawing, where it is again flotated. From this secondary set good fibres are returned to conduit 6 through a conduit 17.

FIGURE 2 shows a single unit in a larger scale than FIGURE 1. The parts described in connection with FIGURE 1 bear the same reference numerals. The impeller 5 is fixed on a shaft 18 which is driven by a belt drive 19 from a variable speed motor 20. The impeller 5 is arranged at the bottom of the tank of unit 2. Outside the tank in direct proximity to the bottom thereof the feed conduit 6 for the uncleaned material is connected to a whirl-producing equipment 21 which, in this embodiment, consists of a spiral casing arranged coaxially to the impeller 5.

The whirl producing equipment 21 can also be designed as a tangential feed conduit to the impeller or as guide vanes or baffles coordinated to the impeller and shaped accordingly. Rotary motion similar to that of the impeller is imparted to the uncleaned material by the whirl producing equipment 21. The suspension therefore has a preliminary whirling movement before it reaches the impeller. This preliminary whirling movement saves driving energy for the impeller which would otherwise require a motor of higher capacity.

The air feed conduit 7 is arranged in the center of the spiral casing 21 and in the center of the connection 22 between the spiral casing 21 and the bottom of the tank 2 coaxially to the impeller 5 and terminates in the center thereof. The end 23 of the air conduit 7 is provided with a nozzle. As a result, better distribution of air is obtained in the uncleaned material and this material as well as air are evenly admitted to all the impeller blades.

A distributor screen 24, constructed as a sieve, is fixed to the bottom of the tank, concentric to the impeller 5, and is covered with a plate 25. In the present instance this distributor screen 24 is cylindrical but it may have some other shape, such as that of a truncated cone. By constructing the distributor screen 24 as a sieve a very much finer and more energy-saving distribution of the air is attained than in the case of the known distributors consisting of a ring of ribs or vanes.

Several guide plates or baffles 26 are arranged on the bottom of the flotation tank and extend from the distributor screen 24 surrounding the impeller 5 almost up to the walls of the tank. The whirling motion of the uncleaned material passing out from the distributor screen 24 is neutralized thereby and rotary motion prevented from being imparted to the contents of the tank. The guide plates or baffles 26 are arranged in fan-shape and extend in the direction of the distributor screen 24 to the tank walls. Only one such guide plate 26 is shown in the drawing.

FIGURE 3 shows the shape given to the flotation unit to improve the discharge of the foam. It reduces in width, at least in the upper part, in the direction towards the foam skimmer 11. By shaping the tank in this way, a current is produced in the region of the surface level of the suspension which carries the foam to the overflow at an increased velocity as compared with the known floators. As a consequence, the foam is led off relatively quickly so that a disintegration of the foam in the material, which is often rapid, cannot take place at all or only to a very slight extent. Owing to the damming and resultant higher level of the foam, the fiber content of the foam is also reduced.

The quick discharge of the foam by means of foam overflow 11 is essentially assisted in that this narrow overflow in relation to tank width is attached to a side wall of the tank on that side, preferably perpendicular, to which the movement of the impeller circumference and the movement of the foam to the overflow is directed. The wall leading gradually from tank width to overflow width is arranged on the other side of the tank on which the movement of the impeller circumference is opposite to the movement of the foam towards the overflow.

In FIGURE 4 another whirl producing equipment 21 is shown. In this arrangement the uncleaned material is fed tangentially to an approximately cylindrically shaped vessel, fixed beneath the tank in coaxial relation to the impeller half. This procedure imparts a rotating movement on the uncleaned material before it enters the impeller 5. The rotating movement is of the same sense of rotation as the impeller.

As per FIGURE 5 the uncleaned material is fed to the impeller 5 through a feed conduit 6 coaxially to the impeller. Guide vanes are fixed to the bottom of the tank, arranged in a circle concentric to impeller 5. All guide vanes 27 feature the same angle with relation to radial direction. This arrangement imparts upon the incoming uncleaned material a whirling motion of same sense of rotation as the impeller 5.

The advantages of the flotation machine according to the present invention as compared with former constructions consist in the finer and more uniform distribution of air as well as in the improved discharge of the foam containing the printer's ink. Thus it is possible to obtain a more perfect treatment of the uncleaned material with a fewer number of flotation units.

It will be understood that this invention is susceptible to modifications in order to adapt it to different usages and conditions and, accordingly, it is desired to comprehend such modifications within this invention as may fall within the scope of the appended claims.

We claim:

1. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

2. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feeding means to produce a whirl of said waste paper suspension of same sense of rotation as said impeller rotates, before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

3. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, a spiral casing disposed in said first feeding means and leading to an inlet of the impeller, to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

4. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, tangential feeding means disposed in said first feeding means and leading to the center of said impeller, to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

5. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, a second feeding means for feeding air into the tank, a rotatably mounted impeller disposed in the tank in the paths of the waste paper suspension and the air, a number of guide vanes evenly disposed in the path of the waste paper suspension in the center of said impeller coordinated in the direction of rotation of said impeller and fixed to said tank, to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

6. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, a second feeding means for feeding air into the tank, a rotatably mounted impeller disposed in the tank in the paths of the waste paper suspension and the air, said first and said second feeding means being separated from each other up to the center of said impeller, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

7. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, said first and said second feeding means being separated from each other up to the center of said impeller, so as to enter the center of the impeller from below in concentric arrangement thereto, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

8. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, said first and said second feeding means being separated from each other up to the center of said impeller, so as to enter the center of the impeller from below in concentric arrangement thereto, said means for feeding air having a nozzle-shaped discharge opening directed towards the center of said impeller, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

9. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feeding means to produce a whirl of said waste paper suspension before entering the center of said impeller, a distributor screen fixed to said tank and surrounding said impeller, said distributor screen being constructed as a sieve made of a mesh-like perforated wall, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

10. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feedings means to produce a whirl of said waste paper suspension before entering the center of said impeller, a distributor screen fixed to said tank and surrounding said impeller, said distributor screen being constructed as a sieve made of a mesh-like perforated wall and covered above said impeller, by a cover plate, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means.

11. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to a second side wall of said tank in a remote relation to said discharge means, said tank, in the direction towards said foam overflow means and at least in the region of and below the liquid level of the suspension, being retracted in width measured between side walls adjacent to said overflow means.

12. A flotation machine for the removal of printer's ink from a disintegrated waste paper suspension to produce a cleaned suspension, comprising: at least one tank for accommodating the waste paper suspension to be flotated, said tank consisting of a bottom and a plurality of side walls and having a liquid level of said suspension therein, first feeding means for feeding the uncleaned waste paper suspension into the tank, second feeding means for feeding air into the tank, a rotatably mounted impeller disposed in the tank in the paths of the waste paper suspension and the air, means disposed in said first feeding means to produce a whirl of said waste paper suspension before entering the center of said impeller, a distributor screen fixed to said tank and surrounding said impeller, guide plates mounted at said tank and extending radially from the outside of said distributor screen to the side walls of said tank, discharge means for discharging the cleaned suspension, said discharge means arranged at a first side wall of said tank below the liquid level therein, and overflow means for discharging foam or froth produced in said waste paper suspension during rotation of said impeller, said overflow means being attached to said tank in a remote relation to said discharge means, said tank, in the direction towards said foam overflow means and at least in the region of and below the liquid level of the suspension, being retracted in width measured between side walls adjacent to said overflow means, said foam overflow means being disposed adjacent to that side wall lying proximate to a portion of the circumference of said impeller which portion has a direction of rotation parallel to the movement of the foam towards said overflow means.

References Cited in the file of this patent

UNITED STATES PATENTS

| | | |
|---|---|---|
| 1,314,316 | Flinn | Aug. 26, 1919 |
| 1,381,673 | Sherwood | June 14, 1921 |
| 1,583,141 | Greenwalt | May 4, 1926 |
| 2,178,239 | McKenna | Oct. 31, 1939 |
| 2,696,913 | Anderson | Dec. 14, 1954 |
| 2,767,964 | Potts | Oct. 23, 1956 |

FOREIGN PATENTS

| | | |
|---|---|---|
| 562,921 | Great Britain | July 21, 1944 |